United States Patent
Fang et al.

(10) Patent No.: US 12,055,823 B2
(45) Date of Patent: Aug. 6, 2024

(54) DISPLAY PANEL

(71) Applicant: TCL CHINA STAR OPTOELECTRONICS TECHNOLOGY CO., LTD., Guangdong (CN)

(72) Inventors: Jingxin Fang, Guangdong (CN); Ji Li, Guangdong (CN); Qi Zhang, Guangdong (CN); Lei Lin, Guangdong (CN); Jing Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,751

(22) PCT Filed: Dec. 22, 2021

(86) PCT No.: PCT/CN2021/140632
§ 371 (c)(1),
(2) Date: Jun. 29, 2023

(87) PCT Pub. No.: WO2023/115420
PCT Pub. Date: Jun. 29, 2023

(65) Prior Publication Data
US 2024/0045280 A1 Feb. 8, 2024

(30) Foreign Application Priority Data

Dec. 20, 2021 (CN) .......................... 202111564889.2

(51) Int. Cl.
*G02F 1/1343* (2006.01)
*G02F 1/1337* (2006.01)

(52) U.S. Cl.
CPC .. *G02F 1/134309* (2013.01); *G02F 1/133765* (2021.01)

(58) Field of Classification Search
CPC ......... G02F 1/134309; G02F 1/134318; G02F 1/134327; G02F 1/134336;
(Continued)

(56) References Cited

U.S. PATENT DOCUMENTS

| 5,587,821 A * | 12/1996 | Nakanishi ......... G02F 1/133634 349/180 |
| 2017/0097546 A1 | 4/2017 | Lazo Martinez et al. |
| 2022/0035206 A1* | 2/2022 | Cao ...................... G09G 3/3655 |

FOREIGN PATENT DOCUMENTS

| CN | 1696774 A | 11/2005 |
| CN | 101281332 A | 10/2008 |

(Continued)

OTHER PUBLICATIONS

Chinese Office Action issued in corresponding Chinese Patent Application No. 202111564889.2 dated Jan. 20, 2023, pp. 1-8.
(Continued)

*Primary Examiner* — Hoan C Nguyen
(74) *Attorney, Agent, or Firm* — PV IP PC; Wei Te Chung; Zhigang Ma (57) ABSTRACT

The present invention discloses a display device, wherein the display device includes: a plurality of pixels arranged in an array, wherein liquid crystals corresponding to the plurality of pixels in odd-numbered columns have a first liquid crystal pretilt angle, and the liquid crystals corresponding to the plurality of pixels in even-numbered columns have a second liquid crystal pretilt angle; or, the liquid crystals corresponding to the plurality of pixels in odd-numbered rows have the first liquid crystal pretilt angle, and the liquid crystals corresponding to the plurality of pixels in even-numbered rows have the second liquid crystal pretilt angle; and wherein the first liquid crystal pretilt angle and the second liquid crystal pretilt angle are different from each other.

17 Claims, 3 Drawing Sheets

(58) Field of Classification Search
CPC ......... G02F 1/133749; G02F 1/133753; G02F 1/133757; G02F 1/133761; G02F 1/133765; G02F 1/13378; G02F 1/133707; G02F 1/13394; G09G 3/3655; G09G 3/3644; G09G 3/3688; G09G 3/36; G09G 2300/0426; G09G 2320/0686
See application file for complete search history.

(56) References Cited

FOREIGN PATENT DOCUMENTS

| | | | |
|---|---|---|---|
| CN | 101452171 A | | 6/2009 |
| CN | 101699334 A | | 4/2010 |
| CN | 102749775 A | | 10/2012 |
| CN | 203519981 U | | 4/2014 |
| CN | 107209426 A | | 9/2017 |
| CN | 111025770 A | | 4/2020 |
| CN | 111880340 A | | 11/2020 |
| JP | H0553136 A | * | 3/1993 |
| JP | H06308497 A | | 11/1994 |
| JP | H09179110 A | * | 7/1997 |
| JP | 2001296518 A | * | 10/2001 |
| KR | 20060088591 A | * | 8/2006 |

OTHER PUBLICATIONS

International Search Report in International application No. PCT/CN2021/140632, mailed on Sep. 14, 2022.
Written Opinion of the International Search Authority in International application No. PCT/CN2021/140632, mailed on Sep. 14, 2022.

* cited by examiner

DISPLAY PANEL

BACKGROUND OF INVENTION

Field of Invention

The present application relates to the field of display technology, in particular to a display device with a liquid crystal alignment design having multiple liquid crystal pretilt angles.

Description of Prior Art

Large-sized thin film transistor liquid crystal display (TFT-LCD) is currently the mainstream technology used in displays. With continuous improvement of information technology and living standards, people have higher and higher requirements for factors that affect the image quality of displays, such as viewing angles etc. In addition, compared with in-plane-switching liquid crystal display (IPS-LCD) and organic light-emitting diode (OLED), vertical alignment liquid crystal display (VA-LCD) has poor viewing angles. Therefore, improvement of the viewing angles has always been a focus of VA-LCD for researchers, and under a same pixel structure, the liquid crystal pretilt angle is one of the important factors that affect the viewing angles. At present, in a display known in the industry, a transparent pixel electrode pattern (ITO pattern) is arranged above a thin film transistor (TFT) array, and an entire surface the transparent pixel electrode pattern is covered by a color filter (CF). In high-quality vertical alignment (HVA) technology, only one voltage difference is formed between the common electrode arranged above the panel close to a side of the color filter and the pixel electrode below the panel close to a side of the array side, so that the liquid crystals in the entire panel only form a liquid crystal pretilt angle. Because there is only one liquid crystal pretilt angle, according to a principle of transmitting liquid crystal alignment and a driving scheme, if the viewing angle is required to be increased, the pixels need to be divided into multiple domains. However, division into multiple domains of the pixels will bring a loss of transmittance.

Therefore, there is an urgent need to develop a display device that adopts a liquid crystal alignment scheme with differentiated liquid crystal pretilt angles to significantly improve display image quality.

SUMMARY OF INVENTION

The present application provides a display device that uses high-quality vertical alignment (HVA) technology to form two liquid crystal pretilt angles in one panel of a vertical alignment liquid crystal display (VA-LCD), to achieve diversification of the liquid crystal pretilt angles, and then improve viewing angle characteristics of the VA-LCD panel during actual display. Since the present application does not need to divide a single pixel into multiple domains, under the premise of no loss of transmittance, two liquid crystal pretilt angles can still be formed to improve the viewing angle.

In a first aspect, an embodiment of the present application provides a display device, the display device including: a plurality of pixels arranged in an array, wherein liquid crystals corresponding to the plurality of pixels in odd-numbered columns have a first liquid crystal pretilt angle, and the liquid crystals corresponding to the plurality of pixels in even-numbered columns have a second liquid crystal pretilt angle; or, the liquid crystals corresponding to the plurality of pixels in odd-numbered rows have the first liquid crystal pretilt angle, and the liquid crystals corresponding to the plurality of pixels in even-numbered rows have the second liquid crystal pretilt angle; and wherein the first liquid crystal pretilt angle and the second liquid crystal pretilt angle are different from each other.

In one embodiment of the present application, an angle difference between the first liquid crystal pretilt angle and the second liquid crystal pretilt angle ranges from 1° to 3.5°.

In one embodiment of the present application, the first liquid crystal pretilt angle ranges from 0.5° to 1.5°; and the second liquid crystal pretilt angle ranges from 1.5° to 4°.

In one embodiment of the present application, the display device further includes: a first patterned common electrode corresponding to the pixels in the odd-numbered columns; and a second patterned common electrode corresponding to the pixels in the even-numbered columns, wherein the first patterned common electrode has a first electrode voltage, the second patterned common electrode has a second electrode voltage, and the first electrode voltage is different from the second electrode voltage.

In one embodiment of the present application, each of the first patterned common electrode and the second patterned common electrode has a comb shape structure, and the comb shape structure of the first patterned common electrode and the comb shape structure of the second patterned common electrode are engaged with each other.

In one embodiment of the present application, each of the first patterned common electrode and the second patterned common electrode has a comb-tooth portion and a comb-handle portion, wherein the comb-tooth portion extends along a length direction of the pixels.

In one embodiment of the present application, the comb-tooth portion of the first patterned common electrode and the comb-tooth portion of the second patterned common electrode are engaged with each other.

In one embodiment of the present application, a voltage difference between the first electrode voltage and the second electrode voltage ranges from 2V to 5V.

In one embodiment of the present application, the first electrode voltage ranges from 10V to 20V; and the second electrode voltage ranges from 15V to 25V.

In one embodiment of the present application, a voltage difference between the first electrode voltage and the second electrode voltage ranges from 3V to 4V; the first electrode voltage ranges from 13V to 18V; and the second electrode voltage ranges from 16V to 22V.

In one embodiment of the present application, the display device further includes: a first patterned common electrode corresponding to the pixels in the odd rows; and a second patterned common electrode corresponding to the pixels in the even-numbered rows, wherein the first patterned common electrode has a first electrode voltage, the second patterned common electrode has a second electrode voltage, and the first electrode voltage is different from the second electrode voltage.

In one embodiment of the present application, each of the first patterned common electrode and the second patterned common electrode has a comb shape structure, and the comb shape structure of the first patterned common electrode and the comb shape structure of the second patterned common electrode are engaged with each other.

In one embodiment of the present application, each of the first patterned common electrode and the second patterned common electrode has a comb-tooth portion and a comb-handle portion, wherein the comb-tooth portion extends along a width direction of the pixels.

In one embodiment of the present application, the comb-tooth portion of the first patterned common electrode and the comb-tooth portion of the second patterned common electrode are engaged with each other.

In one embodiment of the present application, a voltage difference between the first electrode voltage and the second electrode voltage ranges from 2V to 5V.

In one embodiment of the present application, the first electrode voltage ranges from 10V to 20V; and the second electrode voltage ranges from 15V to 25V.

In one embodiment of the present application, a voltage difference between the first electrode voltage and the second electrode voltage ranges from 3V to 4V; the first electrode voltage ranges from 13V to 18V; and the second electrode voltage ranges from 16V to 22V.

In one embodiment of the present application, the pixels include a plurality of red sub-pixels, a plurality of blue sub-pixels, and a plurality of green sub-pixels; wherein each of a plurality of data lines corresponding to the red sub-pixels, the green sub-pixels, and the blue sub-pixels in the odd-numbered rows has a first data line driving voltage; wherein each of the plurality of data lines corresponding to the red sub-pixels, the green sub-pixels, and the blue sub-pixels in the even-numbered rows has a second data line driving voltage; and the first data line driving voltage is different from the second data line driving voltage.

In one embodiment of the present application, a voltage difference between the first data line driving voltage and the second data line driving voltage ranges from 2V to 10V.

In one embodiment of the present application, a voltage difference between the first data line driving voltage and the second data line driving voltage ranges from 5V to 7V.

In the display device provided by the present application, through either of two schemes: a scheme of patterning a common electrode close to a side of a color filter or a scheme of signal connection of data lines of pixels, high-quality vertical alignment (HVA) with two liquid crystal pretilt angles can be realized in one panel to improve the viewing angles. The scheme of patterning a common electrode close to a side of a color filter is to provide two different pattern designs on the common electrode close to the side of the color film, wherein the patterned common electrode with two different patterns are provided with different signals, so that when the liquid crystals are aligned, two voltage differences are formed between the common electrode arranged above the panel close to a side of the color filter and the pixel electrode below the panel close to a side of the array side. In addition, the scheme of signal connection of data lines of pixels is to provide two different signals corresponding to the data lines of the red, green and blue sub-pixels (RGB sub-pixels) in the odd-numbered columns and the data lines of the RGB sub-pixels in the even-numbered columns respectively. When the liquid crystal alignment is performed, the data lines corresponding to the RGB sub-pixels in the odd-numbered columns and the data lines corresponding to the RGB sub-pixels in the even-numbered columns form two voltage differences with the common electrode close to the side of the color filter. With either of the above two schemes, two voltage differences can be formed during liquid crystal alignment, thereby achieving the technical effect of two different liquid crystal pretilt angles in one panel of a vertical alignment liquid crystal display (VA-LCD), thereby enhancing the viewing angle characteristics of the VA-LCD.

Other features and advantages of the present invention will be described in the following description, and partly become obvious from the description, or understood by implementing the present invention. The object and other advantages of the present invention can be realized and obtained through the structures specifically pointed out in the specification, claims and drawings.

BRIEF DESCRIPTION OF DRAWINGS

In order to more clearly illustrate the technical solutions of the embodiments of the application, the drawings illustrating the embodiments will be briefly described below.

DETAILED DESCRIPTION OF PREFERRED EMBODIMENTS

The implementation of the present invention will be described in detail below with reference to the accompanying drawings and embodiments, so as to fully understand how the present invention applies technical means to solve technical problems and achieve the realization process of technical effects and implement them accordingly. It should be noted that, as long as there is no conflict, embodiments of the present invention and features in each embodiment can be combined with each other, and the technical solutions obtained are all within the protection scope of the present invention.

Meanwhile, in the following description, many specific details are set forth for the purpose of explanation to provide a thorough understanding of the embodiments of the present invention. However, it is obvious to those skilled in the art that the present invention can be implemented without the specific details of the embodiments or the specific manners described.

The present application provides a display device that uses high-quality vertical alignment (HVA) technology to form two liquid crystal pretilt angles in one panel of a vertical alignment liquid crystal display (VA-LCD), to achieve diversification of the liquid crystal pretilt angles, and then improve viewing angle characteristics of the VA-LCD panel during actual display. Since the present application does not need to divide a single pixel into multiple domains, under the premise of no loss of transmittance, two liquid crystal pretilt angles can still be formed to improve the viewing angle.

Figure 1:
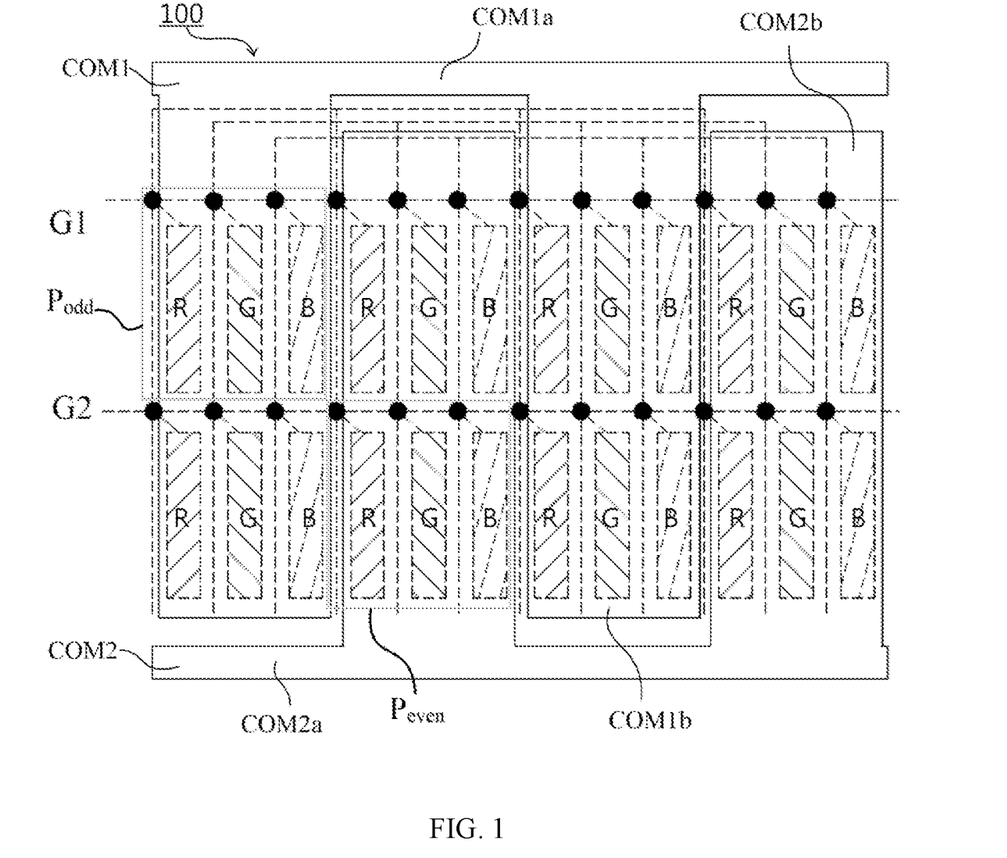
FIG. 1 is a schematic top view of a display device according to an embodiment of the present application.
Figure 2:
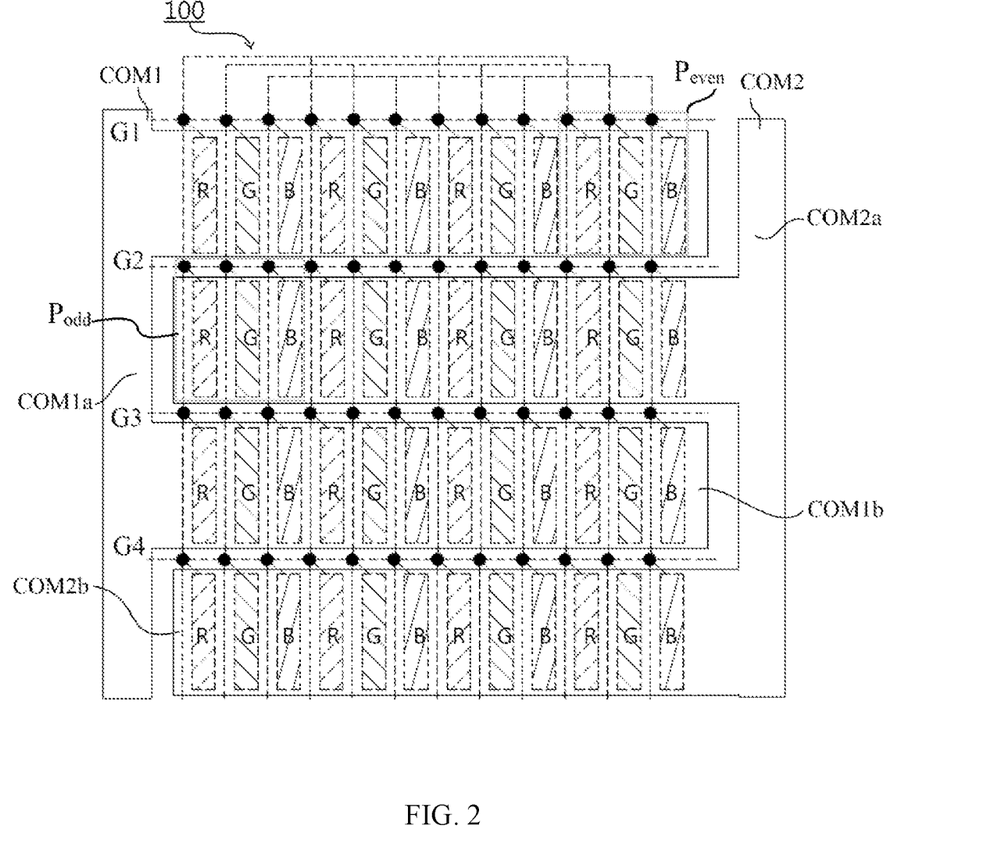
FIG. 2 is a schematic top view of a display device according to another embodiment of the present application.
Figure 3:
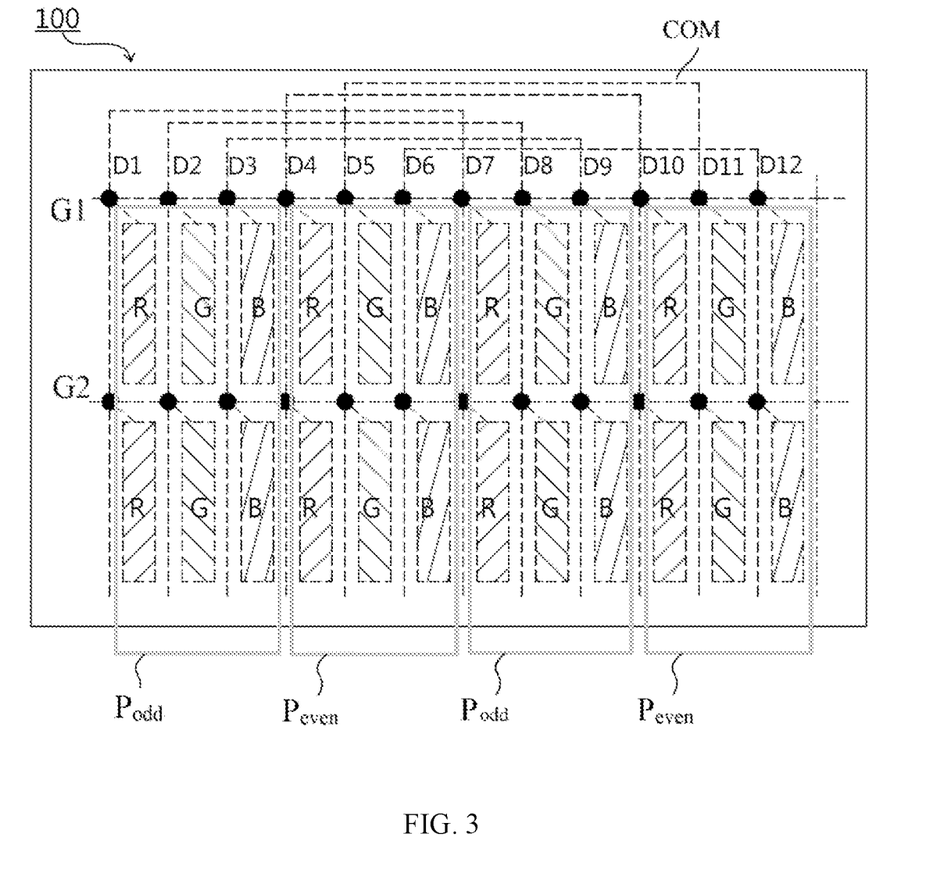
FIG. 3 is a schematic top view of a display device according to still another embodiment of the present application.

Referring to FIGS. 1 to 3, FIGS. 1 to 3 show schematic top views of a display device according to various embodiments of the present application. As shown in FIGS. 1 to 3, in order to achieve the above object, an embodiment of the present application provides a display device 100. The display device 100 includes: a plurality of pixels $P_{odd}/P_{even}$ arranged in an array; The liquid crystals corresponding to the plurality of pixels $P_{odd}$ in the odd-numbered columns have a first liquid crystal pretilt angle, and the liquid crystals corresponding to the plurality of pixels $P_{even}$ in the even-numbered columns have a second liquid crystal pretilt angle; or the liquid crystals corresponding to the plurality of pixels $P_{odd}$ in the odd-numbered rows have a first liquid crystal pretilt angle, the liquid crystals corresponding to the plurality of pixels Peen in even-numbered rows have a second liquid crystal pretilt angle; and wherein the first liquid crystal pretilt angle and the second liquid crystal pretilt angle are different from each other.

In an embodiment of the present application, an angle difference between the first liquid crystal pretilt angle and the second liquid crystal pretilt angle ranges from 1° to 3.5°. Preferably, the angle difference between the first liquid crystal pretilt angle and the second liquid crystal pretilt angle ranges from 2° to 3°. In a specific embodiment of the present application, the first liquid crystal pretilt angle ranges from 0.5° to 1.5°; and the second liquid crystal pretilt angle ranges from 1.5° to 4°.

The present application first provides a scheme of patterning a common electrode close to a side of a color filter, which is to provide two different pattern designs on the common electrode close to the side of the color film, wherein the patterned common electrode with two different patterns are provided with different signals, so that when the liquid crystals are aligned, two voltage differences are formed between the common electrode arranged above the panel close to a side of the color filter and the pixel electrode below the panel close to a side of the array side, thereby achieving the technical effect of two different liquid crystal pretilt angles in one panel of a vertical alignment liquid crystal display (VA-LCD), thereby enhancing the viewing angle characteristics of the VA-LCD.

The scheme of patterning a common electrode close to a side of a color filter provided by the embodiment of the present application will be detailed below in conjunction with the drawings.

Referring to FIG. 1, in a first embodiment of the scheme of patterning a common electrode close to a side of a color filter of the present application, the display device 100 further includes: a first patterned common electrode COM1 corresponding to the pixels $P_{odd}$ in the odd-numbered columns; and a second patterned common electrode COM2 corresponding to the pixels $P_{even}$ of the even-numbered columns, wherein the first patterned common electrode COM1 has a first electrode voltage, the second patterned common electrode COM2 has a second electrode voltage, and the first electrode voltage is different from the second electrode voltage.

As shown in FIG. 1, in the first embodiment of the scheme of patterning a common electrode close to a side of a color filter of the present application, each of the first patterned common electrode COM1 and the second patterned common electrode COM2 has a comb shape structure, and the comb shape structure of the first patterned common electrode COM1 and the comb shape structure of the second patterned common electrode COM2 are engaged with each other. In addition, each of the first patterned common electrode COM1 and the second patterned common electrode COM2 has a comb-tooth portion COM1b/COM2b and a comb-handle portion COM1a/COM2a, wherein the comb-tooth portion COM1b/COM2b extends along a length direction of the pixels $P_{odd}/P_{even}$. In this embodiment, the comb-tooth portion COM1b of the first patterned common electrode COM1 and the comb-tooth portion COM2b of the second patterned common electrode COM2 are engaged with each other.

Referring to FIG. 2, in a second embodiment of the scheme of patterning a common electrode close to a side of a color filter of the present application, the display device 100 further includes: a first patterned common electrode COM1, the first patterned common electrode COM1 corresponding to the pixels $P_{odd}$ in the odd-numbered rows of pixels $P_{odd}$; and a second patterned common electrode COM2, the second patterned common electrode COM2 corresponding to the even-numbered rows of pixels $P_{even}$, wherein the first patterned common electrode COM1 has a first electrode voltage, The second patterned common electrode COM2 has a second electrode voltage, and the first electrode voltage is different from the second electrode voltage.

Specifically, as shown in FIG. 2, each of the first patterned common electrode COM1 and the second patterned common electrode COM2 has a comb shape structure, and the comb shape structure of the first patterned common electrode COM1 and the comb shape structure of the second patterned common electrode COM2 are engaged with each other. In addition, each of the first patterned common electrode COM1 and the second patterned common electrode COM2 has a comb-tooth portion COM1b/COM2b and a comb-handle portion COM1a/COM2a, wherein the comb-tooth portion COM1b/COM2b extends along a width direction of the pixels $P_{odd}/P_{even}$. In this embodiment, the comb-tooth portion COM1b of the first patterned common electrode COM1 and the comb-tooth portion COM2b of the second patterned common electrode COM2 are engaged with each other.

Still referring to FIGS. 1 and 2, in an embodiment of the scheme of patterning a common electrode close to a side of a color filter of the present application, a voltage difference between the first electrode voltage and the second electrode voltage ranges from 2V to 5V; preferably, the voltage difference between the first electrode voltage and the second electrode voltage ranges from 3V to 4V; wherein the first electrode voltage ranges from 10V to 20V, preferably 13V to 18V; and the second electrode voltage ranges from 15V to 25V, preferably 16V to 22V.

In addition, as shown in FIG. 1 and FIG. 2, each of the pixels $P_{odd}/P_{even}$ includes: a red sub-pixel R, a blue sub-pixel B, and a green sub-pixel G; a plurality of scan lines G1/G2/G3 . . . /Gn; and a plurality of data lines D1/D2/D3 . . . /Dn which intersect perpendicularly the plurality of scan lines G1/G2/G3 . . . /Gn. It should be noted that although the present application only provides the above-mentioned two embodiments shown in FIG. 1 and FIG. 2 as examples for illustration, that is, the pattern of the common electrode according to a row arrangement of the pixels $P_{Odd}/P_{even}$ in the array and according to a column arrangement of the pixel $P_{odd}/P_{even}$ in the array, respectively, which is divided into the first patterned common electrode COM1 and the second patterned common electrode COM2, and the first patterned common electrode COM1 and the second patterned common electrode COM2 have comb-shaped patterns that are symmetrical but staggered with each other, and each of the first patterned common electrode COM1 and the second patterned common electrode COM2 successively covers the red sub-pixel R, the blue sub-pixel B, and the green sub-pixel G. However, in other embodiments of the present application, the patterns of the first patterned common electrode COM1 and the second patterned common electrode COM2 may also be asymmetrical, that is, one of the first patterned common electrode COM1 and the second patterned common electrode COM2 may only cover two adjacent ones of the red sub-pixel R, the blue sub-pixel B, and the green sub-pixel G, and the remaining one of the red sub-pixel R, the blue sub-pixel B, and the green sub-pixel G is covered by another one of the first patterned common electrode COM1 and the second patterned common electrode COM2.

In addition, it should be understood that those skilled in the art can make the pattern design of the first patterned common electrode COM1 and the second patterned common electrode COM2 comply with a minimum spacing requirement of processes for an electrode spacing between the first patterned common electrode COM1 and the second patterned common electrode COM2; and the first patterned common electrode COM1 and the second patterned common electrode COM2 completely cover corresponding pixel electrodes (not shown) at a side of the array side.

On the basis of maintaining the common electrode COM to cover an entire surface (without patterning the common electrode COM), the present application also provides a scheme of signal connection of data lines of pixels $P_{odd}$/$P_{even}$, which is to provide two different signals corresponding to the data lines of the red, green and blue sub-pixels (RGB sub-pixels) in the odd-numbered columns and the data lines of the RGB sub-pixels in the even-numbered columns respectively. When the liquid crystal alignment is performed, the data lines corresponding to the RGB sub-pixels in the odd-numbered columns and the data lines corresponding to the RGB sub-pixels in the even-numbered columns form two voltage differences with the common electrode close to the side of the color filter, thereby achieving the technical effect of two different liquid crystal pretilt angles in one panel of a vertical alignment liquid crystal display (VA-LCD), thereby enhancing the viewing angle characteristics of the VA-LCD.

The scheme of signal connection of data lines of pixels provided by the embodiment of the present application will be detailed below in conjunction with the drawings.

Referring to FIG. 3, in an embodiment of the scheme of signal connection of data lines of pixels of the present application, the common electrode COM covers an entire surface, and the pixels include a red sub-pixel R, a blue sub-pixel B, and a green sub-pixel G; wherein the plurality of data lines D1/D7 corresponding to the plurality of red sub-pixels R of the plurality of pixels $P_{odd}$ in the odd-numbered rows are electrically connected; the plurality of data lines D2/D8 corresponding to the plurality of green sub-pixel G of the plurality of pixels $P_{odd}$ in the odd-numbered rows are electrically connected; and the plurality of data lines D3/D9 corresponding to the plurality of blue sub-pixels B of the plurality of pixels $P_{odd}$ in the odd-numbered rows are electrically connected. Each of the plurality of data lines D1/D2/D3/D7D8/D9 corresponding to the plurality of red sub-pixels R, the plurality of green sub-pixels G, and the plurality of blue sub-pixels B of the plurality of pixels $P_{odd}$ in the odd rows/D7D8/D9 has a first data line driving voltage. The plurality of data lines D4/D10 corresponding to the plurality of red sub-pixels R of the plurality of pixels $P_{even}$ in the even-numbered rows are electrically connected, the plurality of data lines D5/D11 corresponding to the plurality of green sub-pixels G of the plurality of pixels $P_{even}$ in the even-numbered rows are electrically connected, and the plurality of data lines D6/D12 corresponding to the plurality of blue sub-pixels B of the plurality of pixels $P_{even}$ in the even-numbered rows are electrically connected. Each of the plurality of data lines D4/D5/D6/D10/D11/D12 corresponding to the plurality of red sub-pixels R, the plurality of green sub-pixels G, and the plurality of blue sub-pixels B of the plurality of pixels $P_{even}$ in the even-numbered rows has a second data line driving voltage. The first data line driving voltage is different from the second data line driving voltage.

Still referring to FIG. 3, specifically, in an embodiment of the scheme of signal connection of data lines of pixels of the present application, two adjacent groups of red sub-pixels R, blue sub-pixels B, and green sub-pixels G, that is 6 sub-pixels of two adjacent pixels corresponding to 6 data lines, three data lines corresponding to the first group of the red sub-pixel R, the blue sub-pixel B, and the green sub-pixel G are provided with a first data line driving voltage, and three data lines corresponding to the second group of the red sub-pixel R, the blue sub-pixel B, and the green sub-pixel G are provided with a second data line driving voltage, wherein the first data line driving voltage is different from the second data line driving voltage.

Specifically, as shown in FIG. 3, in an embodiment of the scheme of signal connection of data lines of pixels of the present application, the voltage difference between the first data line driving voltage and the second data line driving voltage ranges from 2V to 10V, preferably 3V to 8V, more preferably 5V to 7V.

It should be noted that further comparing respective advantages of the above-mentioned scheme of patterning a common electrode close to a side of a color filter and the scheme of signal connection of data lines of pixels, it can be seen that the scheme of patterning a common electrode close to a side of a color filter has an advantage that when performing liquid crystal alignment, signal input of the red sub-pixel R, the blue sub-pixel B, and the green sub-pixel G is relatively simple; while the scheme of signal connection of data lines of pixels has an advantage that the cost is lower, and when performing liquid crystal alignment, signal input of the common electrode close to the side of the color filter is relatively simple.

It is appreciated from the content described above that in the display device 100 provided by the present application, through either of two schemes: a scheme of patterning a common electrode close to a side of a color filter or a scheme of signal connection of data lines of pixels, high-quality vertical alignment (HVA) with two liquid crystal pretilt angles can be realized in one panel to improve the viewing angles. In the display device provided by the present application, through either of two schemes: a scheme of patterning a common electrode close to a side of a color filter or a scheme of signal connection of data lines of pixels, high-quality vertical alignment (HVA) with two liquid crystal pretilt angles can be realized in one panel to improve the viewing angles. The scheme of patterning a common electrode close to a side of a color filter is to provide two different pattern designs on the common electrode close to the side of the color film, wherein the patterned common electrode with two different patterns are provided with different signals, so that when the liquid crystals are aligned, two voltage differences are formed between the common electrode arranged above the panel close to a side of the color filter and the pixel electrode below the panel close to a side of the array side. In addition, the scheme of signal connection of data lines of pixels is to provide two different signals corresponding to the data lines of the red, green and blue sub-pixels (RGB sub-pixels) in the odd-numbered columns and the data lines of the RGB sub-pixels in the even-numbered columns respectively. When the liquid crystal alignment is performed, the data lines corresponding to the RGB sub-pixels in the odd-numbered columns and the data lines corresponding to the RGB sub-pixels in the even-numbered columns form two voltage differences with the common electrode close to the side of the color filter. With either of the above two schemes, two voltage differences can be formed during liquid crystal alignment, thereby achieving the technical effect of two different liquid crystal pretilt angles in one panel of a vertical alignment liquid crystal display (VA-LCD), thereby enhancing the viewing angle characteristics of the VA-LCD. Since the present application does not need to divide a single pixel into multiple domains, under the premise of no loss of transmittance, two liquid crystal pretilt angles can still be formed to improve the viewing angle.

In addition, the features of each embodiment can be combined arbitrarily to form a new embodiment, and all new embodiments formed by the combination fall within the protection scope of the present invention. The described features or characteristics may be combined into one or more embodiments in any other suitable manner. In the above description, some specific details are provided, such as thickness, quantity, etc., in order to provide a comprehensive understanding of the embodiments of the present invention. However, those skilled in the relevant art will understand that the present invention can be implemented without one or more of the above specific details, or it can be implemented by other methods, components, materials, etc.

Although the above examples are used to illustrate the principles of the present invention in one or more applications, for those skilled in the art, without departing from the principles and ideas of the present invention, it is obvious that various modifications can be made in the form, usage, and implementation details without creative work. Therefore, the present invention is defined by the appended claims.

What is claimed is:

1. A display device, wherein the display device comprises:
a plurality of pixels arranged in an array,
wherein liquid crystals corresponding to the plurality of pixels in odd-numbered columns have a first liquid crystal pretilt angle, and the liquid crystals corresponding to the plurality of pixels in even-numbered columns have a second liquid crystal pretilt angle; or, the liquid crystals corresponding to the plurality of pixels in odd-numbered rows have the first liquid crystal pretilt angle, and the liquid crystals corresponding to the plurality of pixels in even-numbered rows have the second liquid crystal pretilt angle; and
wherein the first liquid crystal pretilt angle and the second liquid crystal pretilt angle are different from each other;
the display device further comprises:
a first patterned common electrode corresponding to the pixels in the odd-numbered columns; and
a second patterned common electrode corresponding to the pixels in the even-numbered columns,
wherein the first patterned common electrode has a first electrode voltage, the second patterned common electrode has a second electrode voltage, and the first electrode voltage is different from the second electrode voltage;
a voltage difference between the first electrode voltage and the second electrode voltage ranges from 2V to 5V.

2. The display device according to claim 1, wherein an angle difference between the first liquid crystal pretilt angle and the second liquid crystal pretilt angle ranges from 1° to 3.5°.

3. The display device according to claim 1, wherein the first liquid crystal pretilt angle ranges from 0.5° to 1.5°; and
the second liquid crystal pretilt angle ranges from 1.5° to 4°.

4. The display device according to claim 1, wherein each of the first patterned common electrode and the second patterned common electrode has a comb shape structure, and the comb shape structure of the first patterned common electrode and the comb shape structure of the second patterned common electrode are engaged with each other.

5. The display device according to claim 4, wherein each of the first patterned common electrode and the second patterned common electrode has a comb-tooth portion and a comb-handle portion, wherein the comb-tooth portion extends along a length direction of the pixels.

6. The display device according to claim 5, wherein the comb-tooth portion of the first patterned common electrode and the comb-tooth portion of the second patterned common electrode are engaged with each other.

7. The display device according to claim 1, wherein
the first electrode voltage ranges from 10V to 20V; and
the second electrode voltage ranges from 15V to 25V.

8. The display device according to claim 1, wherein
a voltage difference between the first electrode voltage and the second electrode voltage ranges from 3V to 4V;
the first electrode voltage ranges from 13V to 18V; and
the second electrode voltage ranges from 16V to 22V.

9. A display device, wherein the display device comprises:
a plurality of pixels arranged in an array,
wherein liquid crystals corresponding to the plurality of pixels in odd-numbered columns have a first liquid crystal pretilt angle, and the liquid crystals corresponding to the plurality of pixels in even-numbered columns have a second liquid crystal pretilt angle; or, the liquid crystals corresponding to the plurality of pixels in odd-numbered rows have the first liquid crystal pretilt angle, and the liquid crystals corresponding to the plurality of pixels in even-numbered rows have the second liquid crystal pretilt angle; and
wherein the first liquid crystal pretilt angle and the second liquid crystal pretilt angle are different from each other;
wherein the display device further comprises:
a first patterned common electrode corresponding to the pixels in the odd rows; and
a second patterned common electrode corresponding to the pixels in the even-numbered rows,
wherein the first patterned common electrode has a first electrode voltage, the second patterned common electrode has a second electrode voltage, and the first electrode voltage is different from the second electrode voltage,
a voltage difference between the first electrode voltage and the second electrode voltage ranges from 2V to 5V.

10. The display device according to claim 9, wherein each of the first patterned common electrode and the second patterned common electrode has a comb shape structure, and the comb shape structure of the first patterned common electrode and the comb shape structure of the second patterned common electrode are engaged with each other.

11. The display device according to claim 10, wherein each of the first patterned common electrode and the second patterned common electrode has a comb-tooth portion and a comb-handle portion, wherein the comb-tooth portion extends along a width direction of the pixels.

12. The display device according to claim 11, wherein the comb-tooth portion of the first patterned common electrode and the comb-tooth portion of the second patterned common electrode are engaged with each other.

13. The display device according to claim 9, wherein
the first electrode voltage ranges from 10V to 20V; and
the second electrode voltage ranges from 15V to 25V.

14. The display device according to claim 9, wherein
a voltage difference between the first electrode voltage and the second electrode voltage ranges from 3V to 4V;

the first electrode voltage ranges from 13V to 18V; and
the second electrode voltage ranges from 16V to 22V.

15. A display device, wherein the display device comprises:
- a plurality of pixels arranged in an array,
- wherein liquid crystals corresponding to the plurality of pixels in odd-numbered columns have a first liquid crystal pretilt angle, and the liquid crystals corresponding to the plurality of pixels in even-numbered columns have a second liquid crystal pretilt angle; or, the liquid crystals corresponding to the plurality of pixels in odd-numbered rows have the first liquid crystal pretilt angle, and the liquid crystals corresponding to the plurality of pixels in even-numbered rows have the second liquid crystal pretilt angle; and
- wherein the first liquid crystal pretilt angle and the second liquid crystal pretilt angle are different from each other; wherein the pixels comprise a plurality of red sub-pixels, a plurality of blue sub-pixels, and a plurality of green sub-pixels;
- wherein each of a plurality of data lines corresponding to the red sub-pixels, the green sub-pixels, and the blue sub-pixels in the odd-numbered rows has a first data line driving voltage;
- wherein each of the plurality of data lines corresponding to the red sub-pixels, the green sub-pixels, and the blue sub-pixels in the even-numbered rows has a second data line driving voltage; and
- the first data line driving voltage is different from the second data line driving voltage.

16. The display device according to claim 15, wherein a voltage difference between the first data line driving voltage and the second data line driving voltage ranges from 2V to 10V.

17. The display device according to claim 15, wherein a voltage difference between the first data line driving voltage and the second data line driving voltage ranges from 5V to 7V.

* * * * *